United States Patent [19]

Matsuura et al.

[11] Patent Number: 5,452,462
[45] Date of Patent: Sep. 19, 1995

[54] GLOBAL COMMUNICATION INTERRUPT CONTROL SYSTEM FOR COMMUNICATION BETWEEN REAL AND VIRTUAL MACHINE SYSTEMS USING GLOBAL COMMUNICATION FUNCTIONS OF A SHARED MEMORY

[75] Inventors: Hidekazu Matsuura; Masaru Saito, both of Kawasaki, Japan

[73] Assignee: Fujitsu Limited, Kawasaki, Japan

[21] Appl. No.: 386,342

[22] Filed: Feb. 10, 1995

Related U.S. Application Data

[63] Continuation of Ser. No. 61,051, May 14, 1993, abandoned.

[30] Foreign Application Priority Data

May 15, 1992 [JP] Japan .................................. 4-122984

[51] Int. Cl.⁶ ........................ G06F 9/46; G06F 13/14; G06F 15/163
[52] U.S. Cl. .................... 395/650; 395/800; 395/406; 395/477; 395/478; 395/728; 395/733; 364/228; 364/228.1; 364/230.2; 364/280.8; 364/228.2; 364/DIG. 1
[58] Field of Search .............. 395/725, 425, 275, 800, 395/650, 700, 200

[56] References Cited

U.S. PATENT DOCUMENTS

| | | | |
|---|---|---|---|
| 4,400,769 | 8/1983 | Kaneda et al. | 395/650 |
| 4,812,967 | 3/1989 | Hirosawa et al. | 395/725 |
| 4,837,674 | 6/1989 | Takane | 395/275 |
| 4,860,190 | 8/1989 | Kaneda et al. | 395/275 |
| 5,109,489 | 4/1992 | Umeno et al. | 395/275 |
| 5,109,522 | 4/1992 | Lent et al. | 395/800 |
| 5,187,802 | 2/1993 | Inoue et al. | 395/800 |
| 5,283,900 | 2/1994 | Frankel et al. | 395/700 |

FOREIGN PATENT DOCUMENTS

| | | | |
|---|---|---|---|
| 3-36633 | 2/1991 | Japan | G06F 9/46 |
| 4-44131 | 2/1992 | Japan | G06F 9/46 |

*Primary Examiner*—Gopal C. Ray
*Attorney, Agent, or Firm*—Staas & Halsey

[57] ABSTRACT

A global communication interrupt control system is provided with a real machine system including one or a plurality of real machines; a virtual machine system including one or a plurality of virtual machines, which are realized by an operating system and a control program which makes the virtual machines operable; and a shared memory which is shared by the real machine system and the virtual machine system. The shared memory includes a global communication function for establishing communication between an arbitrary real machine of the real machine system and an arbitrary virtual machine of the virtual machine system. The real machine issues an interrupt of a communication request with respect to a specific virtual machine using the global communication function. The virtual machine system includes a hold device for holding the interrupt from the real machine and reflecting the interrupt to the control program, and a cancel device for cancelling the holding of the interrupt by the hold device at a time when the control program reflects the interrupt to the specific virtual machine, so that the hold device maintains a held state of the interrupt until the interrupt is actually reflected to the specific virtual machine.

29 Claims, 12 Drawing Sheets

F I G. 1 2
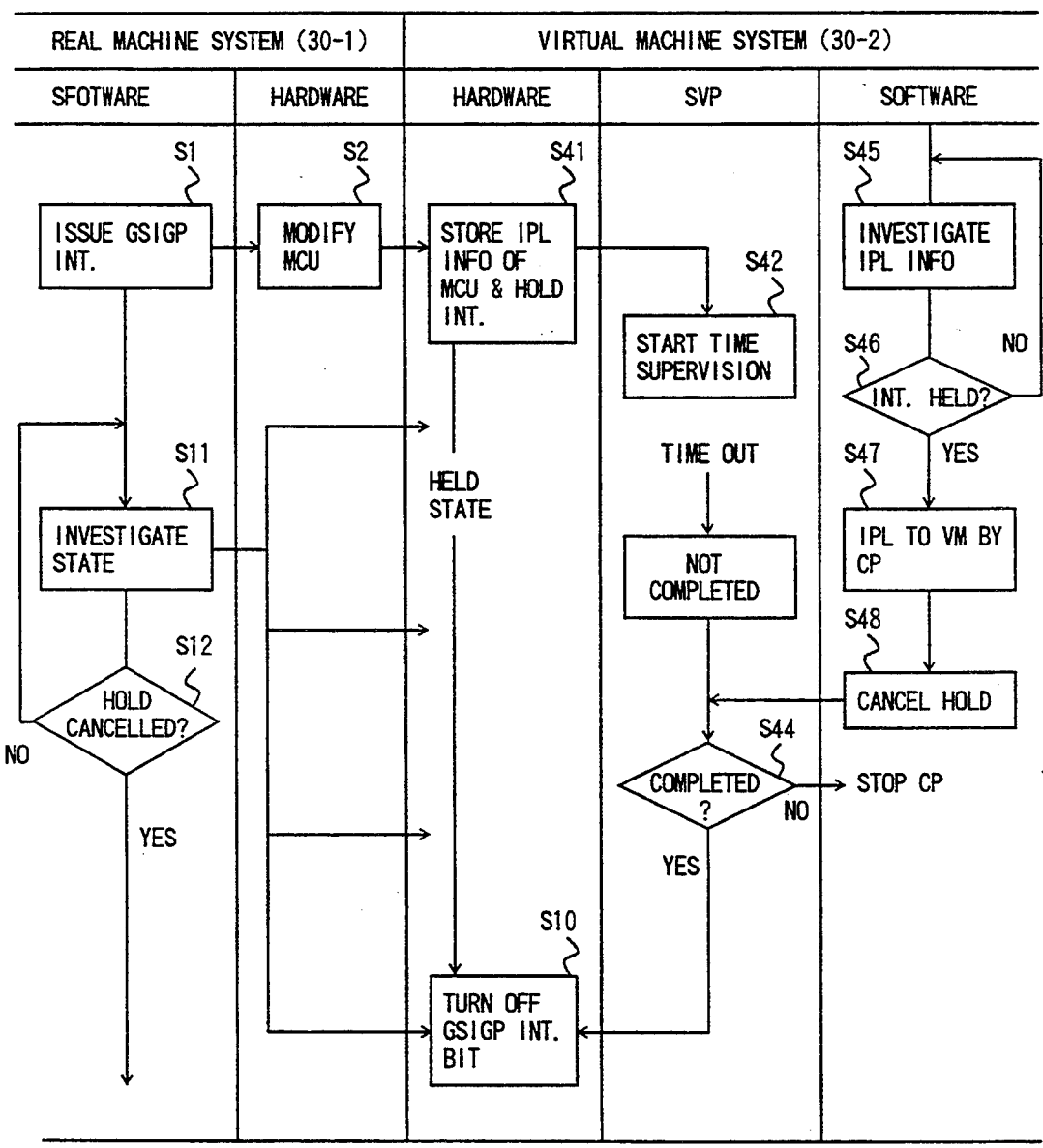

GLOBAL COMMUNICATION INTERRUPT CONTROL SYSTEM FOR COMMUNICATION BETWEEN REAL AND VIRTUAL MACHINE SYSTEMS USING GLOBAL COMMUNICATION FUNCTIONS OF A SHARED MEMORY

This application is a continuation of application Ser. No. 08/061,051, filed May 14, 1993, now abandoned.

BACKGROUND OF THE INVENTION

The present invention generally relates to global communication interrupt control systems, and more particularly to a global communication interrupt control system which is used when making a communication between a real machine system and a virtual machine system using a global communication function of a shared memory.

In this specification, the global communication function will hereinafter also be referred to as a global signal processor (GSIGP).

A large computer system made up of a plurality of computer systems has various applications. In one example of such applications, a system storage unit which is provided as an external storage is shared by a real machine of one computer system and a guest virtual machine (guest VM) which is a virtual machine of another computer system. In this case, effective utilization of a central processing unit (CPU) by the virtual machine can be realized, while realizing a high-speed hot stand-by and a high-speed process by the plurality of computer systems.

When realizing a communication between the real machine and the virtual machine of different computer systems using the global signal processor (GSIGP), hardware is provided to hold a communication interrupt request at the virtual end and to cancel the interrupt hold when the interrupt is reflected to the virtual machine. The interrupt hold state can constantly be monitored by hardware of the real machine which is the source of the interrupt request. If the interrupt hold of the interrupt request is cancelled, it is determined that the interrupt is reflected or sent to the virtual machine and the operation continues to a next process.

If the communication interrupt is issued from the real machine of one computer system to the virtual machine of another computer system, a guest VM which is provided as the virtual machine is put into an operable state by a control program (CP) which is known as a virtual machine (VM) monitor program. The interrupt is first reflected to the control program (CP), and is thereafter reflected to the guest VM. However, the interrupt hold is cancelled at the stage when the interrupt is reflected to the control program (CP). For this reason, although the interrupt is actually not yet reflected to the guest VM, it appears to the source of the interrupt request as if the interrupt has been reflected to the guest VM, and it is desirable to improve the system in this respect.

On the other hand, if the global signal processor (GSIGP) function were used by the real machine system to realize an initial program load (IPL) function of a virtual machine system, the IPL would be made to the control program (CP) and not to the guest VM. As a result, it would be impossible in this case to carry out an accurate process with respect to the guest VM. Moreover, there is a problem in that the real machine system cannot be aware of the actual state of the virtual machine system.

SUMMARY OF THE INVENTION

Accordingly, it is a general object of the present invention to provide a novel and useful global communication interrupt control system in which the problems described above are eliminated.

Another and more specific object of the present invention is to provide a global communication interrupt control system comprising a real machine system including one or a plurality of real machines, a virtual machine system including one or a plurality of virtual machines which are realized by an operating system and a control program which makes the virtual machines operable, and a shared memory which is shared by the real machine system and the virtual machine system: The shared memory includes global communication means for making or establishing communication between an arbitrary real machine of the real machine system and an arbitrary virtual machine of the virtual machine system. The real machine includes means for issuing an interrupt of a communication request with respect to a specific virtual machine using the global communication means, and the virtual machine system includes hold means for holding the interrupt from the real machine and reflecting the interrupt to the control program, and cancel means for cancelling the holding of the interrupt by the hold means at a time when the control program reflects the interrupt to the specific virtual machine, so that the hold means maintains a held state of the interrupt until the interrupt is actually reflected to the specific virtual machine. According to the global communication interrupt control system of the present invention, it is possible to accurately confirm, from the real machine system, whether or not the interrupt is actually reflected to the specific virtual machine of the virtual machine system. As a result, it is possible to realize a global communication between the real machine and the virtual machine using the global communication means, in the same manner as the communication between the real machines. Therefore, the operation efficiency and the system reliability of a composite computer system which shares the shared memory between the real machine system and the virtual machine system are considerably improved by the present invention.

Still another object of the present invention is to provide an interrupt control system comprising a real machine system including one or a plurality of real machines, a virtual machine system including one or a plurality of virtual machines which are realized by an operating system and a control program which makes the virtual machines operable, and a shared memory which is shared by the real machine system and the virtual machine system. In this system, the shared memory includes global communication means for making a communication between an arbitrary real machine of the real machine system and an arbitrary virtual machine of the virtual machine system; the real machine includes means for issuing an interrupt of a request with respect to a specific virtual machine using the global communication means; and the virtual machine system includes hold means for holding the interrupt from the real machine and reflecting the interrupt to the control program, and cancel means for cancelling the holding of the interrupt by the hold means at a time when the control program reflects the interrupt to the specific virtual machine, so that the hold means maintains a held state of the interrupt until the interrupt is actually reflected to the specific virtual machine. According to the interrupt control system of the present invention, it is possible to accurately confirm from the real machine system whether or not the interrupt is actually reflected to the specific virtual machine of the virtual machine system.

Other objects and further features of the present invention will be apparent from the following detailed description when read in conjunction with the accompanying drawings.

BRIEF DESCRIPTION OF THE DRAWINGS

FIG. 12 is a flow chart for explaining an initial program load (IPL) function of the virtual machine in the embodiment.

DESCRIPTION OF THE PREFERRED EMBODIMENTS

First, a description will be given of the problem encountered in the conventional system.

Figure 1:
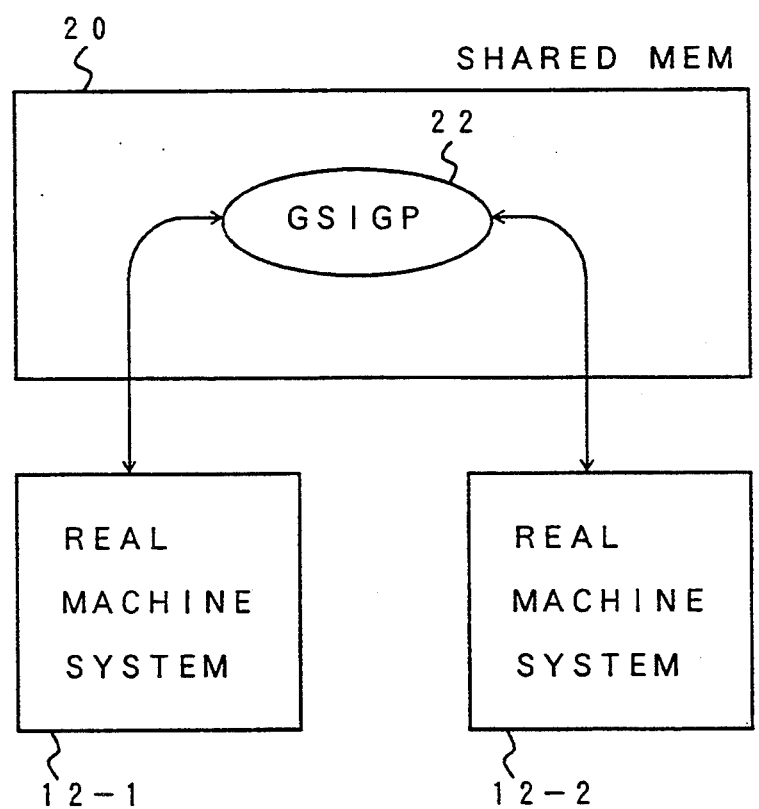
FIG. 1 is a system block diagram for explaining an example of a conventional global communication between real machine systems.

An example of a conventional global communication between real machine systems will be described with reference to FIG. 1. A composite computer system shown in FIG. 1 includes a plurality of real machine systems 12-1 and 12-2 which use a system storage unit 20 as a shared memory 20. In FIG. 1, only two real machine systems are shown for the sake of convenience. A global communication between the real machine systems 12-1 and 12-2 is realized by a global signal processor (GSIG P) 22 provided in the shared memory 20, and it is possible to accurately be aware of the held and reflected states of an interrupt.

Figure 2:
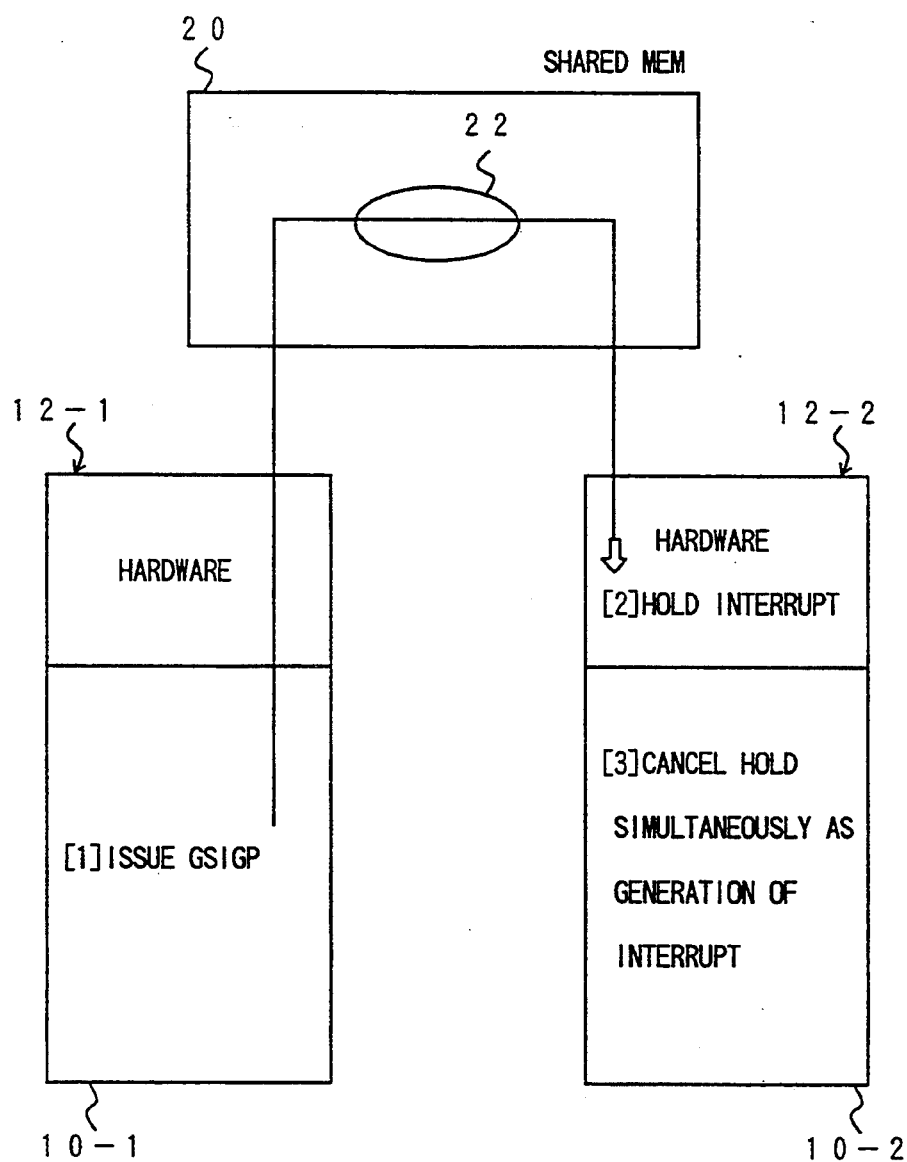
FIG. 2 is a diagram for explaining a conventional communication procedure between the real machine systems in FIG. 1.

FIG. 2 is a diagram for explaining an example of a conventional communication procedure between the Peal machine systems 12-1 and 12-2. In FIG. 2, an interrupt of a communication request, which is issued from a real machine 10-1 of the real machine system 12-1, is held within hardware which is provided in the receiving real machine system 12-2. This held state of the interrupt can be monitored from the source of the interrupt, that is, by the real machine 10-1. More particularly, a process is carried out according to the following procedures [1] through [3] in FIG. 2.

[1] The real machine 10-1 of the real machine system 12-1 issues the interrupt of the communication request so as to communicate with a real machine 10-2 of the real machine 12-2.

[2] The real machine system 12-2 which receives the interrupt from the real machine 10-1 holds the interrupt by a hardware thereof if the interrupt cannot be reflected to the real machine 10-2. In this state, the held state of the interrupt can be confirmed from the real machine 10-1 which is the source of the interrupt.

[3] When it becomes possible to reflect the interrupt to the real machine 10-2, the hardware of the real machine system 12-2 reflects the interrupt to the real machine 10-2. Since the held state of the interrupt is cancelled at the time when the interrupt is reflected to the real machine 10-2, it is possible to confirm, from the real machine 10-1, that the interrupt has been reflected to the real machine 10-2.

However, if the second computer system, which shares the shared memory with the first computer system, is not a real machine and is a guest VM which functions as a virtual machine operable in an operating system (OS) by a control program (CP) which is known as a VM monitor program, a problem occurs when the interrupt of the communication request is issued from the real machine to the guest VM using the global signal processor (GSIGP) similarly as in the case where the first and second computer systems as both real machines. In other words, the interrupt is first reflected to the control program (CP) which makes the guest VM operable in the receiving virtual machine system, and the interrupt is thereafter reflected to the guest VM from the control program (CP). For this reason, the hardware of the virtual machine system which holds the interrupt cancels the held state of the interrupt at the time when the interrupt is reflected to the control program (CP), and the real machine system which is the source cannot accurately judge the held and reflected states of the interrupt in the virtual machine system.

Figure 3:
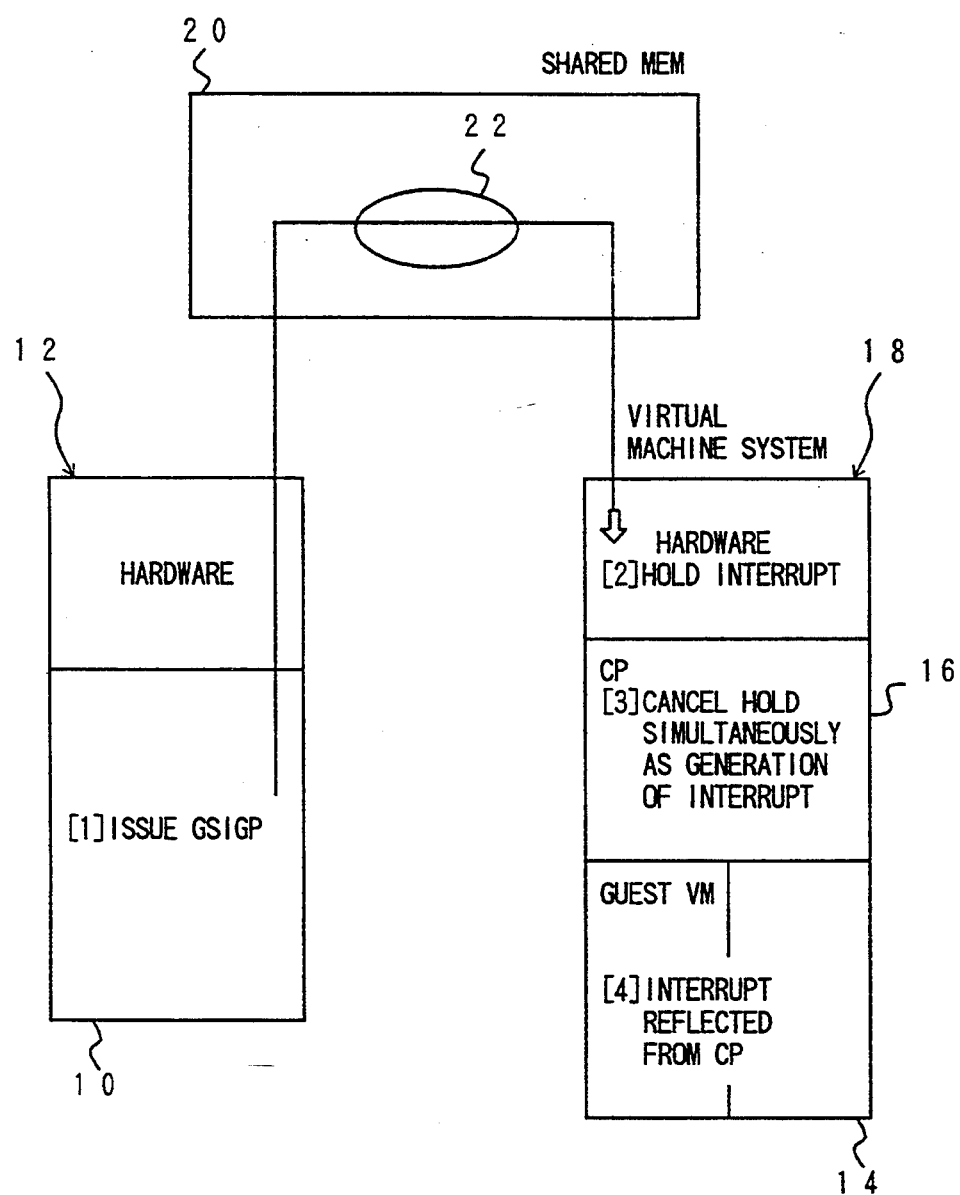
FIG. 3 is a diagram for explaining a conceivable communication procedure between a real machine system and a virtual machine system.

FIG. 3 is a diagram for explaining a conceivable communication procedure between a real machine system and a virtual machine system. A process is carried out according to the following procedures [1] through [4] in FIG. 3.

[1] A real machine 10 of a real computer system 12 is issued an interrupt of a communication request so as to communicate with a guest VM 14 of a virtual machine system 18.

[2] The virtual machine system 18 which receives the interrupt from the real machine 10 holds the interrupt by a hardware thereof if the interrupt cannot be reflected to a control program (CP) 16 of the virtual machine system 18. In this state, the held state of the interrupt can be confirmed from the real machine 10 which is the source of the interrupt.

[3] The hardware of the virtual machine system 18 reflects the interrupt to the control program (CP) 16 when it becomes possible, and the held state of the interrupt is cancelled at the same time. Hence, from the real machine 10 which is the source of the interrupt, it appears as if the interrupt has been reflected to the guest VM 14. However, at this point in time, the interrupt is not yet reflected to the guest VM 14.

[4] Based on the contents of the interrupt which is generated, the control program (CP) 16 reflects the interrupt to the guest VM 14 when it becomes possible.

Figure 4:
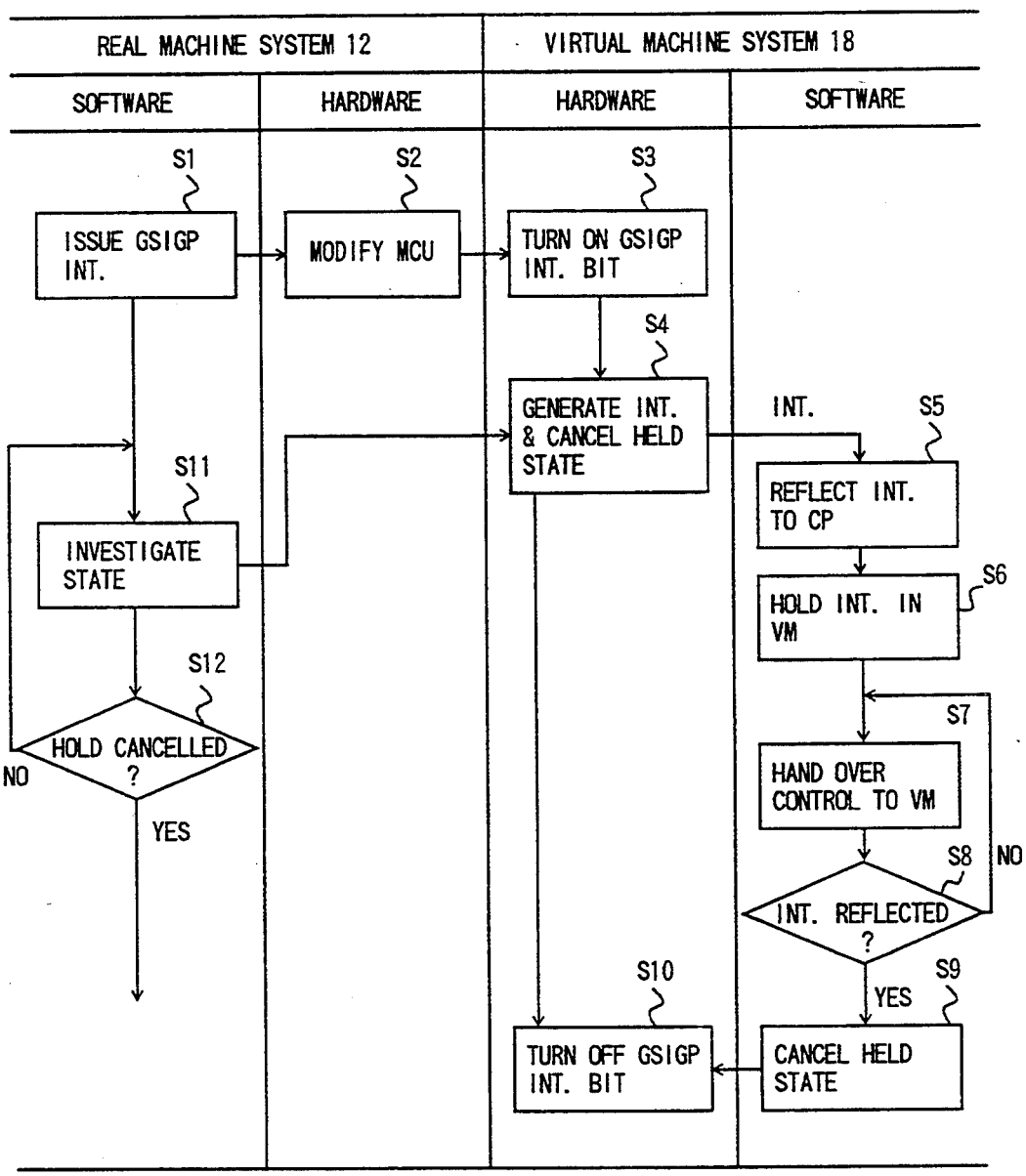
FIG. 4 is a flow chart for explaining a conceivable communication process between the real machine system and the virtual machine system in FIG. 3.

FIG. 4 is a flow chart for explaining the conceivable communication process between the real machine system 12 and the virtual machine system 18 in FIG. 3.

In FIG. 4, the software of the real machine 10 issues a GSIGP interrupt in a step S1. The hardware of the real machine system 12 modifies a main storage control unit (MCU) of the other hardware in a step S2.

Then, the hardware of the virtual machine system 18 turns ON a GSIGP interrupt bit of the MCU in a step S3. In addition, the hardware of the virtual machine system 18 generates the GSIGP interrupt with respect to the control program (CP) 16, and simultaneously cancels the held state of the GSIGP interrupt, in a step S4.

On the other hand, the software of the virtual machine system 18 reflects the GSIGP interrupt from the hardware to the control program (CP) 16 in a step S5, and holds the GSIGP interrupt in the guest VM 14 in a step S6. Further, the control is handed over to the guest VM 14 in a step S7, and the reflection of the GSIGP interrupt is detected in a step S8. If the reflection of the GSIGP interrupt to the guest VM 14 is detected in the step S8, the held state of the GSIGP interrupt in the control program (CP) 16 is cancelled in a step S9.

Hence, the hardware of the virtual machine system 18 turns OFF the GSIGP interrupt bit in a step S10 in response to the cancellation of the held state in the step S9.

On the other hand, the held and reflected states of the GSIGP interrupt can be monitored from the source of the GSIGP interrupt, that is, the software of the real machine 10. More particularly, the software of the real machine 10 investigates the state of the virtual machine system 18 in a step S11, and the cancellation of the held state of the GSIGP interrupt is detected in a step S12.

But as may be seen from the step S4, the held state is cancelled simultaneously as the generation of the GSIGP interrupt with respect to the control program (CP) 16. As a result, it appears to the real machine 10 as if the GSIGP interrupt has been reflected to the guest VM 14 at the time when the GSIGP interrupt is actually only reflected to the control program (CP) 16. For this reason, even though the GSIGP interrupt may actually still be in the held state with respect to the guest VM 14, it appears to the real machine 10 as if the GSIGP interrupt has successfully been reflected to the guest VM 14.

Therefore, there is a problem in that the real machine 10, which is the source of the GSIGP interrupt, cannot accurately judge the held and reflected states of the GSIGP interrupt with respect to the intended guest VM 14. Consequently, an incorrect judgement as to the held and reflected states of the GSIGP interrupt in the real machine 10 may trigger erroneous operations within the complex computer system.

On the other hand, if the global signal processor (GSIGP) function were used by the real machine system 12 to realize an initial program load (IPL) function of the virtual machine system 18, the IPL would be made to the control program (CP) 16 and not to the guest VM 14. As a result, it would be impossible in this case to carry out an accurate process with respect to the guest VM 14, and there is a problem in that the real machine system 12 cannot be aware of the actual state of the virtual machine system 18.

Figure 5:
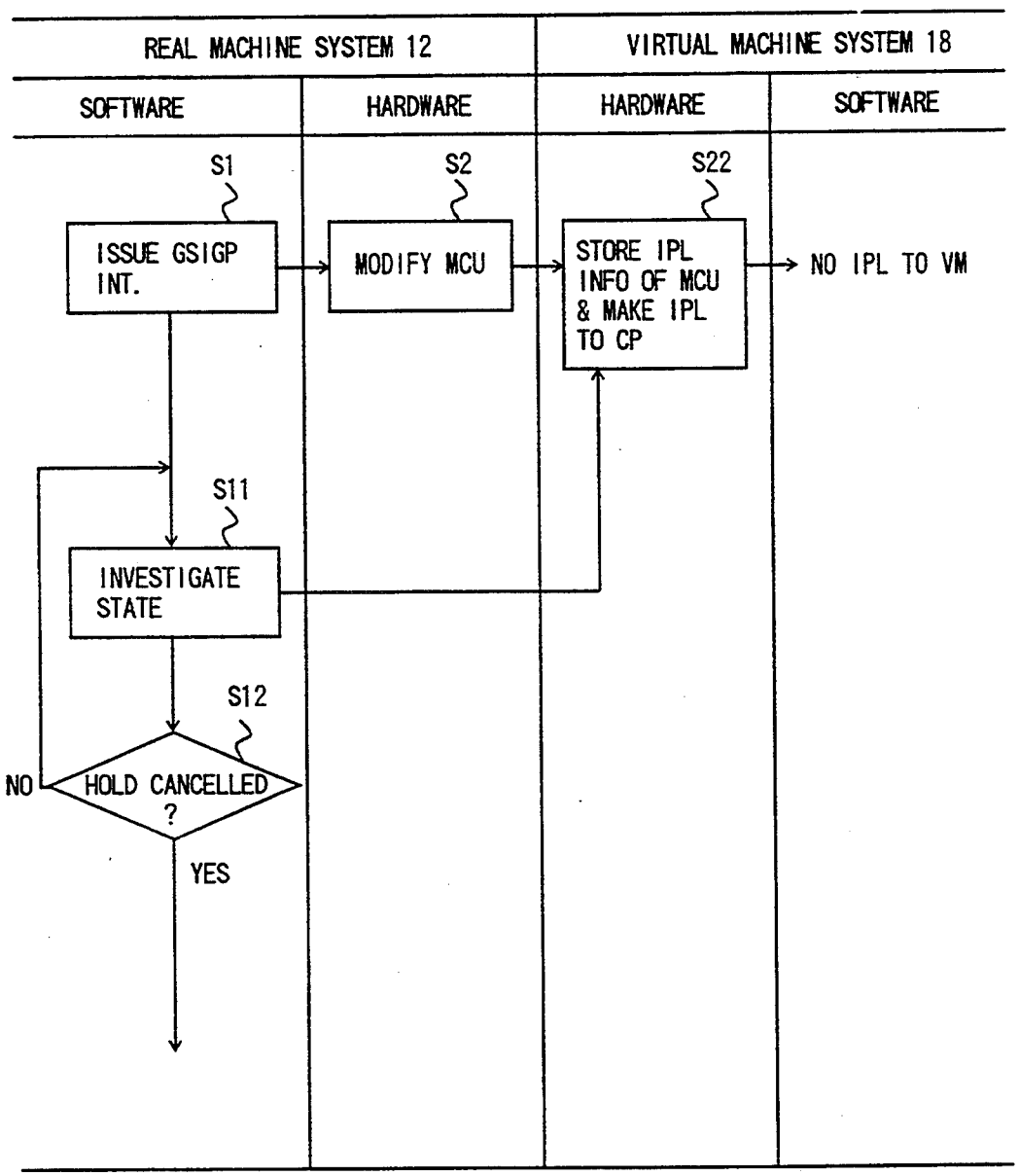
FIG. 5 is a flow chart for explaining a conceivable initial program load (IPL) function of the virtual machine system using a GSIGP interrupt.

FIG. 5 is a flow chart for explaining this conceivable initial program load (IPL) function of the virtual machine system 18 using the GSIGP interrupt. In FIG. 5, those steps which are essentially the same as those corresponding steps in FIG. 4 are designated by the same reference numerals, and a description thereof will be omitted.

In FIG. 5, the software of the real machine 10 issues a GSIGP interrupt of an IPL request in a step S1 so as to realize the IPL function of the virtual machine system 18. The hardware of the real machine system 12 modifies a main storage control unit (MCU) of the other hardware in a step S2.

Then, the hardware of the virtual machine system 18 stores IPL information of the MCU and makes an IPL to the control program (CP) 16 in a step S22.

Hence, even though an IPL was intended to be made to the guest VM 14 which is controlled by the control program (CP) 16, no IPL is made to the guest VM 14 because the IPL is made to the control program (CP) 16.

The object of the present invention is to eliminate the above described problems of the conceivable system.

A description will now be given of the operating principle of the present invention, by referring to FIG. 6.

Figure 6:
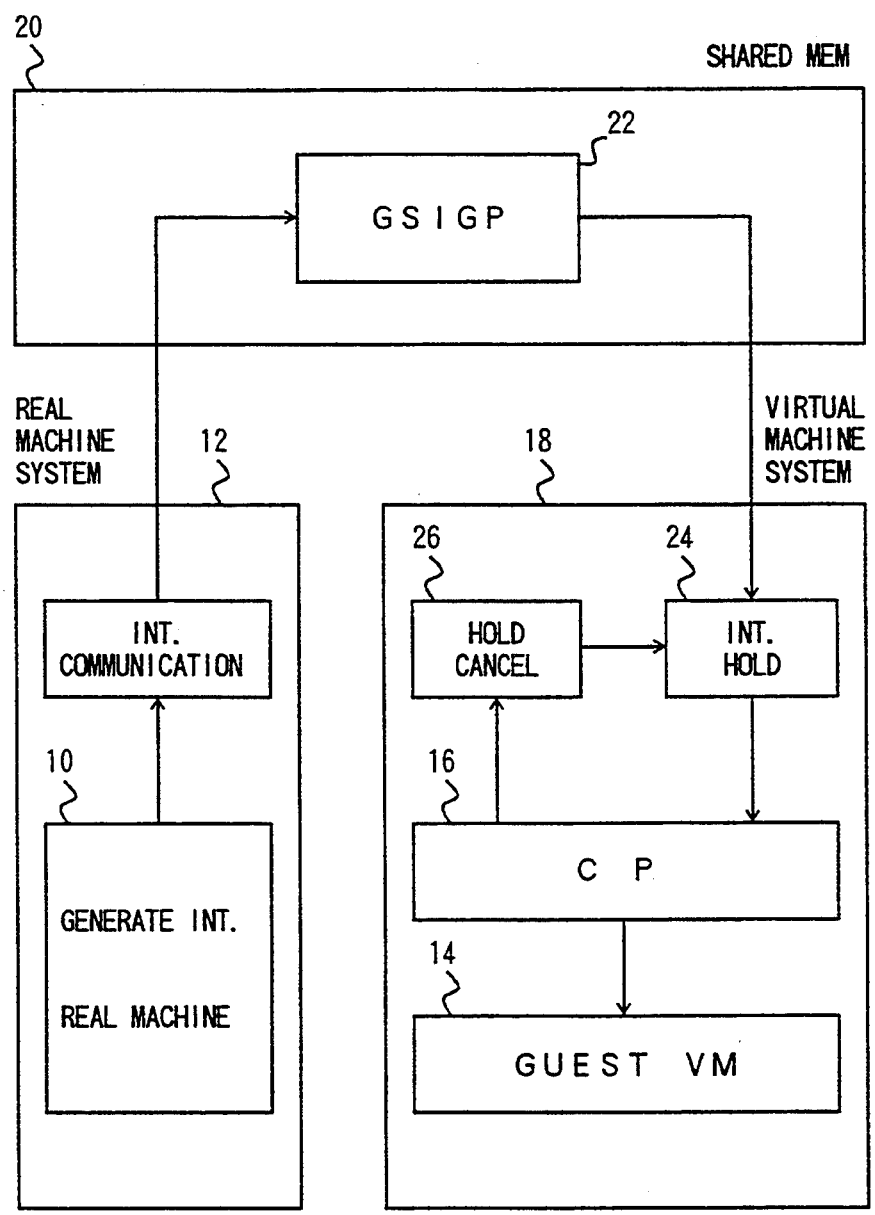
FIG. 6 is a system block diagram for explaining the operating principle of the present invention.

In FIG. 6, a real machine system 12 is provided with one or a plurality of real machines 10. A virtual machine system 18 is provided with one or a plurality of virtual machines (guest VMs) 14 which are realized by an operating system (OS), and a control program (VM monitor program) 16 which makes the virtual machine 14 operable. A shared memory 20 is shared by the real machine system 12 and the virtual machine system 18. This shared memory 20 is provided with a global signal processor (GSIGP) 22 which carries out a communication between the real machine system 12 and the virtual machine system 18. The present invention relates to the global communication interrupt control system which is applicable when a communication request is issued from the real machine 10 to the virtual machine 14 and a communication interrupt control is made in the virtual machine 14.

In the present invention, if an interrupt of a communication request is issued from the real machine 10 of the real machine system 12 to the guest VM 14 of the virtual machine system 18, this interrupt is held in the virtual machine system 18 and is reflected to the control program (CP) 16 by a hold means 24. This hold means 24 maintains the held state of the interrupt until the control program (CP) 16 further reflects the interrupt to the guest VM 14. Hence, from the real machine 10 which is the source of the interrupt, the held state of the interrupt is maintained in the hold means 24 until the interrupt is actually reflected to the guest VM 14. In addition, a hold cancel means 26 of the virtual machine system 18 cancels the held state of the interrupt in the hold means 24 at the time when the control program (CP) 16 reflects the interrupt to the guest VM 14.

Accordingly, the held state of the interrupt is maintained in the hold means 24 until the interrupt is actually reflected to the guest VM 14. As a result, the interrupt to the guest VM 14 can be correctly recognized by the real machine 10 which is the source of the interrupt.

Figure 7:
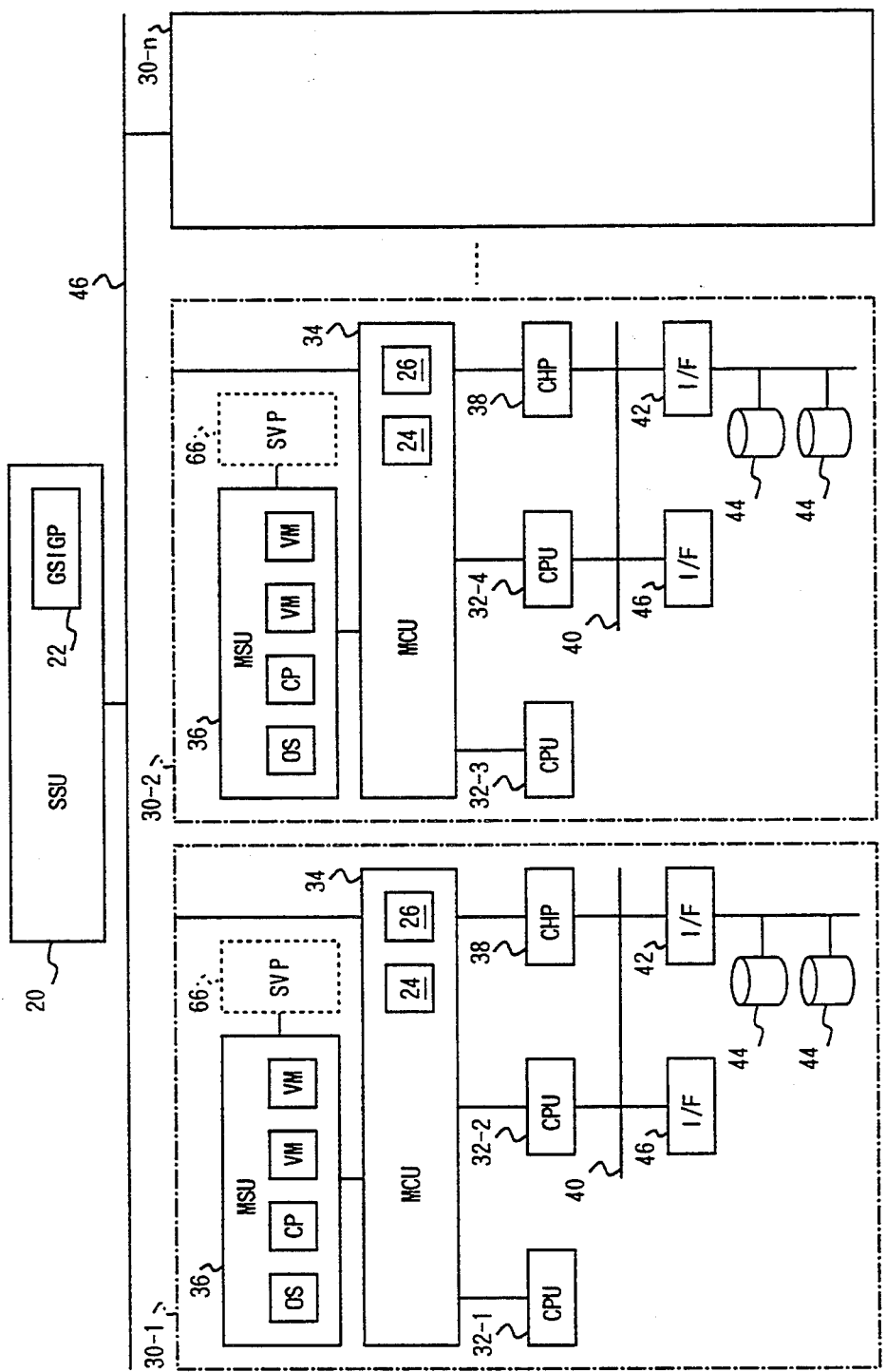
FIG. 7 is a system block diagram showing a composite computer system which is applied with an embodiment of a global communication interrupt control system according to the present invention.

Next, a description will be given of an embodiment of a global communication interrupt control system according to the present invention. FIG. 7 shows a composite computer system which includes this embodiment of the global communication interrupt control system according to the present invention.

In FIG. 7, computer systems 30-1, 30-2, ..., 30-n are coupled via a system bus 46 and share a system storage unit (SSU) 20 which is used as a shared memory. The computer systems 30-1, 30-2, ..., 30-n respectively have the same construction, and a description will only be given with respect to the construction of the computer system 30-1. In addition, only the constructions of the computer systems 30-1 and 30-2 are shown in FIG.7.

In this embodiment, the computer system 30-1 includes two central processing units (CPUs) 32-1 and 32-2, and a main storage unit (MSU) 36 is provided with respect to these CPUs 32-1 and 32-2 via a main storage control unit (MCU) 34. In addition, a system bus 40 for the subsystem is coupled to the MSU 36 via a channel processor (CHP) 38, so as to connect an external unit via the system bus 40.

The system bus 40 in this embodiment is coupled to magnetic disk units 44 via a device interface 42. The magnetic disk units 44 are used as direct access storage devices (DASDs). Further, the system bus 40 may be coupled to a communication line via another device interface 46, or to an appropriate terminal via the device interface 46 and a local area network (LAN), for example.

The SSU 20 is provided with a global signal processor (GSIGP) function 22 which enables communications among the computer systems 30-1 through 30-n. On the other hand, hardware and software necessary to make the global communication using the GSIGP function 22 are provided within the MCU 34 of each of the computer systems 30-1 through 30-n, in correspondence with the GSIGP function 22 of the SSU 20.

For example, the CPU 32-1 within the computer system 30-1 executes an operating system (OS) of the MSU 36 as a real machine. On the other hand, the CPU 32-2 executes an OS of the MSU 36 as a guest VM of a virtual machine, and in order to make the guest VM operable, the CPU 32-2 simultaneously executes a control program (CP) of the MSU 36 known as a VM monitor program. Normally, the OS which is executed by the CPU 32-2 executes a plurality of guest VMs, and one control program (CP) controls the plurality of guest VMs.

Accordingly, the CPU 32-1 of the computer system 30-1 shown in FIG. 7 functions as the real machine 10 shown in FIG. 6, and the CPU 32-2 of the computer system 30-1 shown in FIG. 7 operates as the control program (CP) 16 and the guest VM 14 within the virtual machine system 18 shown in FIG. 6. Furthermore, the interrupt hold means 24 and the hold cancel means 26 of the virtual machine system 18 shown in FIG. 6 is provided in the MCU 34 of the computer system 30-1 shown in FIG. 7. In this embodiment, the interrupt hold means 24 and the hold cancel means 26 are realized by hardware of the MCU 34.

Similarly, a CPU 32-3 of the other computer system 30-2 realizes a real machine, and a CPU 32-4 of this other computer system 30-2 realizes a control program (CP) and a guest VM.

A global communication is made between the computer systems 30-1 and 30-2. In other words, the global communication is made from a real machine which is realized by the CPU 32-1 of the computer system 30-1 to a specific guest VM out of the plurality of guest VMs realized by the CPU 32-4 of the other computer system 30-2, using the GSIGP function 22 of the SSU 20.

The communication interrupt control in the composite computer system shown in FIG. 7 will now be described with reference to FIGS. 8, 9 and 10.

Figure 8:
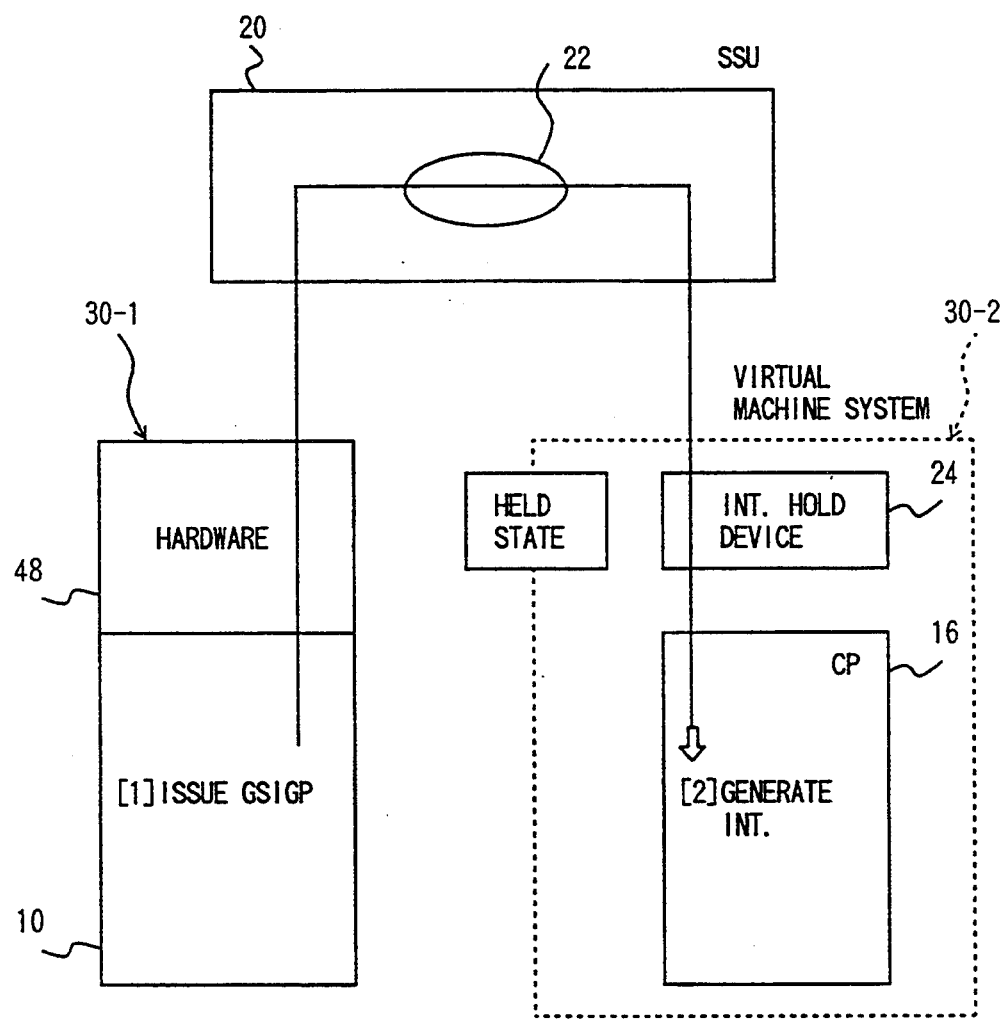
FIG. 8 is a diagram for explaining an interrupt request hold and an interrupt to a control program in the embodiment.
Figure 9:
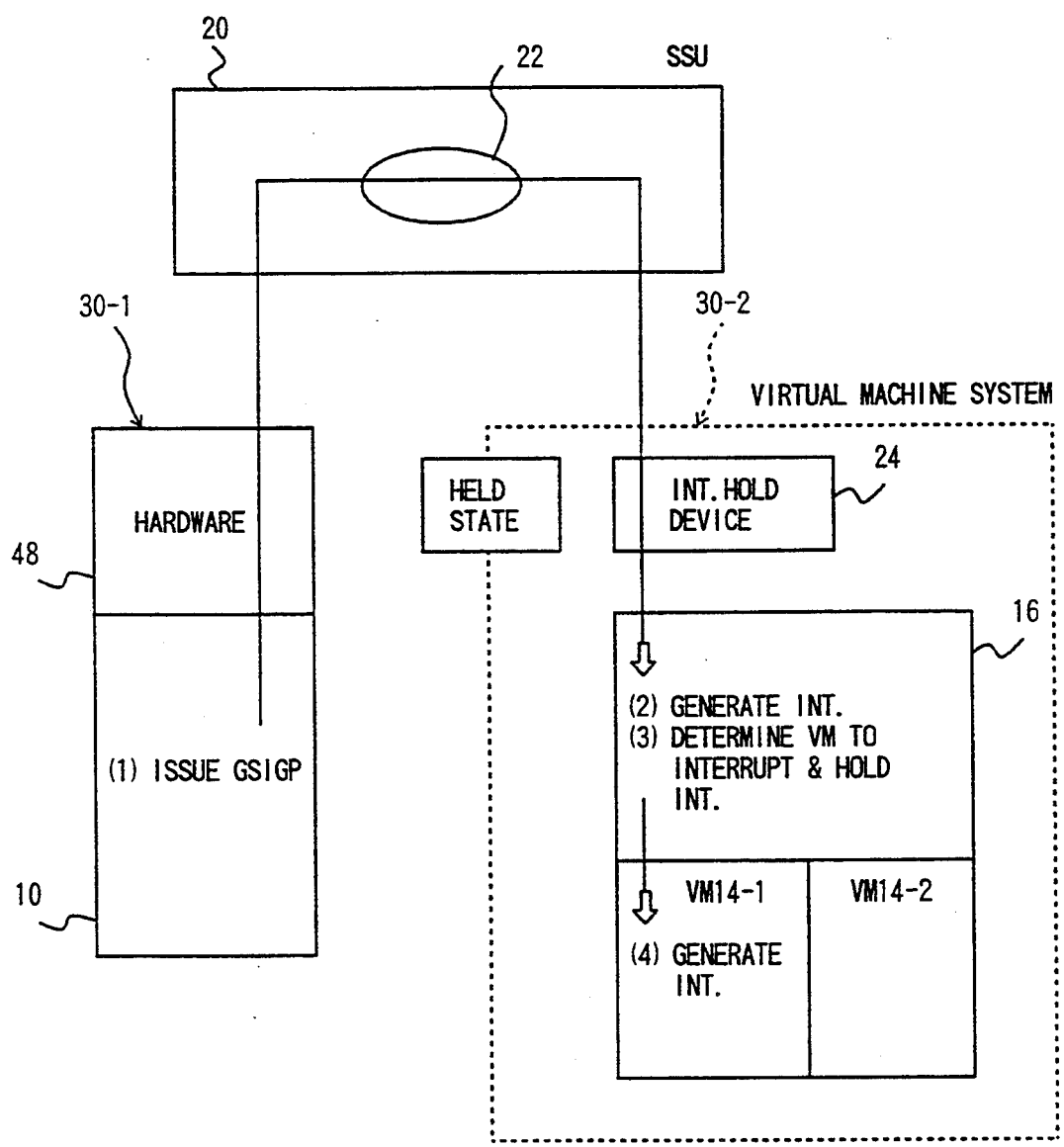
FIG. 9 is a diagram for explaining a determination of a guest VM and an interrupt hold by the control program, and an interrupt to the guest VM in the embodiment.
Figure 10:
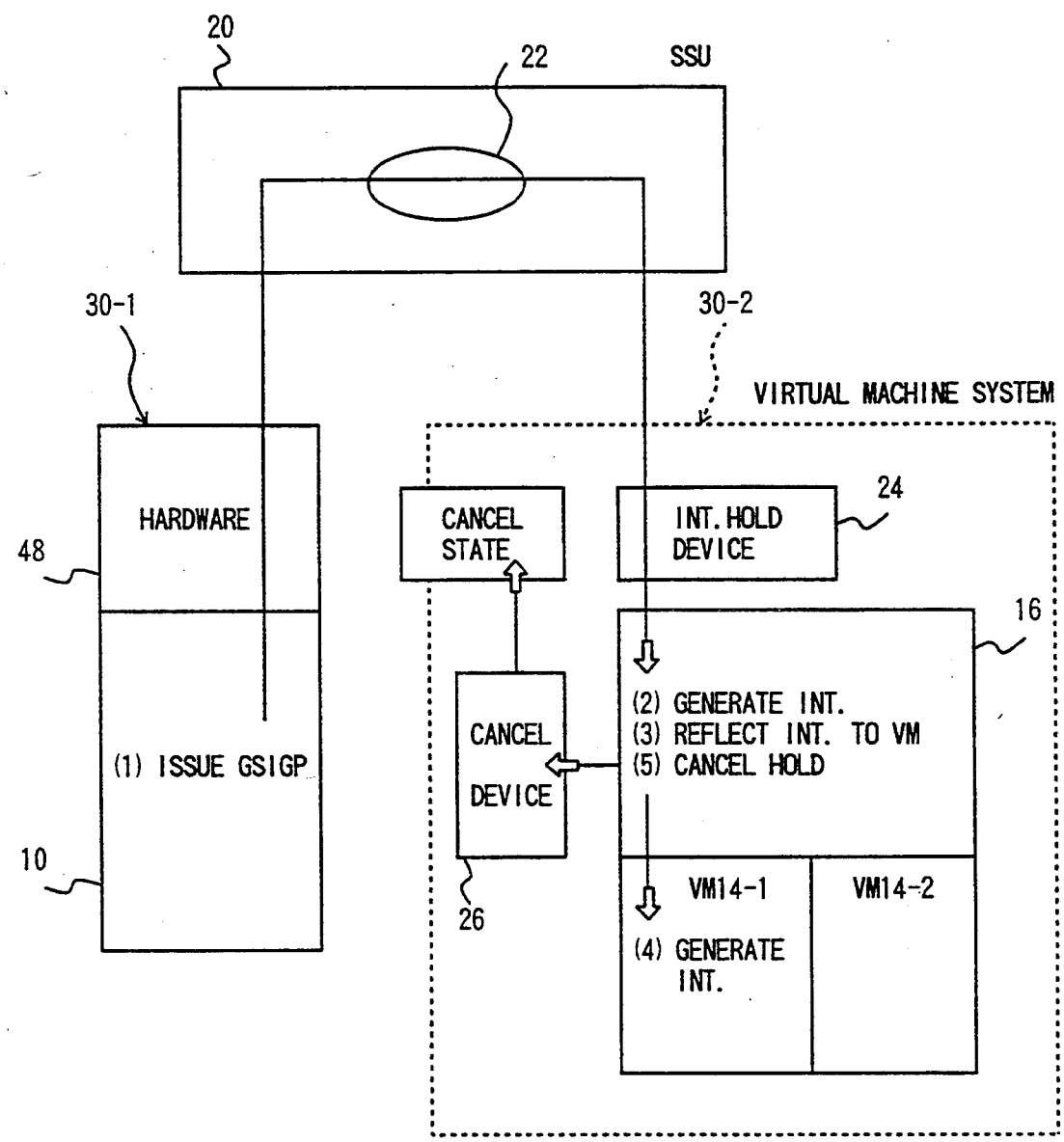
FIG. 10 is a diagram for explaining a cancellation of the interrupt hold in the embodiment.

FIGS. 8, 9 and 10 shows the operation of this embodiment in phases (1) through (5) when the communication is made from the real machine 10 which is realized by the CPU 32-1 of the computer system 30-1 shown in FIG. 7 to a specified guest VM 14-1 out of the plurality of guest VMs 14-1 and 14-2 which are realized by the CPU 32-4 of the other computer system 30-2 shown in FIG. 7, using the GSIGP function 22 of the SSU 20 which is used as the shared memory.

As shown in FIG. 8, the computer system 30-1 is provided with a hardware 48 which executes a communication procedure in conformance with the GSIGP function 22 of the SSU 20. On the other hand, an interrupt hold device 24 which is realized by hardware, and a control program (CP) 16, which is realized by the OS of the CPU 32-4, are provided in the virtual machine system which is realized by the computer system 30-2. In addition, as shown in FIG. 9, two guest VMs 14-1 and 14-2 which are realized by the OS executed by the CPU 32-4 are also provided in the virtual machine system which is realized by the computer system 30-2. The phases (1) through (5) are carried out as follows.

Phase (1):
In order to communicate to the computer system 30-2 shown in FIG. 8, the real machine 10 of the computer system 30-1 issues an interrupt of a communication request using the GSIGP function 22 of the SSU 20.

Phase (2):
The interrupt hold device 24 of the computer system 30-2 which receives the interrupt of the communication request from the computer system 30-1, holds the interrupt by hardware. In this state, the real machine 10 which is the source of the issued interrupt can confirm that this interrupt is in the held state at the virtual machine system which is realized by the computer system 30-2.

The interrupt hold device 24 generates the interrupt when it becomes possible to reflect the interrupt to the control program (CP) 16 of the virtual machine system. According to the conceivable system described above, the held state of the interrupt is cancelled when the interrupt is generated with respect to the control program (CP) 16. However, in this embodiment, the interrupt hold device 24 maintains the held state of the interrupt even after the interrupt is generated. Accordingly, even if the interrupt is generated with respect to the control program (CP) 16, the real machine 10 which is the source of the interrupt continues to confirm that the interrupt is in the held state at the virtual machine system.

Phase (3):
As shown in FIG. 9, the control program (CP) 16 of the virtual machine system determines the guest VM which is to reflect the interrupt, based on the interrupt which is generated from the interrupt hold device 24. In this case, the control program (CP) 16 holds the interrupt with respect to the guest VM 14-1.

Phase (4):
The control program (CP) 16 generates the interrupt to the guest VM 14-1 at the time when it becomes possible to reflect the interrupt to the guest VM 14-1. The interrupt hold device 24 still maintains the held state of the interrupt even at the time when the control program (CP) 16 generates the interrupt to the guest VM 14-1. Accordingly, the real machine 10 which is the source of the interrupt continues to confirm that the interrupt is in the held state at the virtual machine system.

Phase (5):

Next, as shown in FIG. 10, the control program (CP) 16 controls a cancel device 26 to cancel the held state of the interrupt in the interrupt hold device 24 after confirming that the interrupt generated from the control program (CP) 16 is reflected to the guest VM 14-1. As a result, the real machine 10 which is the source of the issued interrupt can accurately confirm that the interrupt of the communication request has been reflected to the intended guest VM 14-1. In other words, the real machine 10 can correctly judge that the global communication request was successfully made, and continue to a next process.

Figure 11:
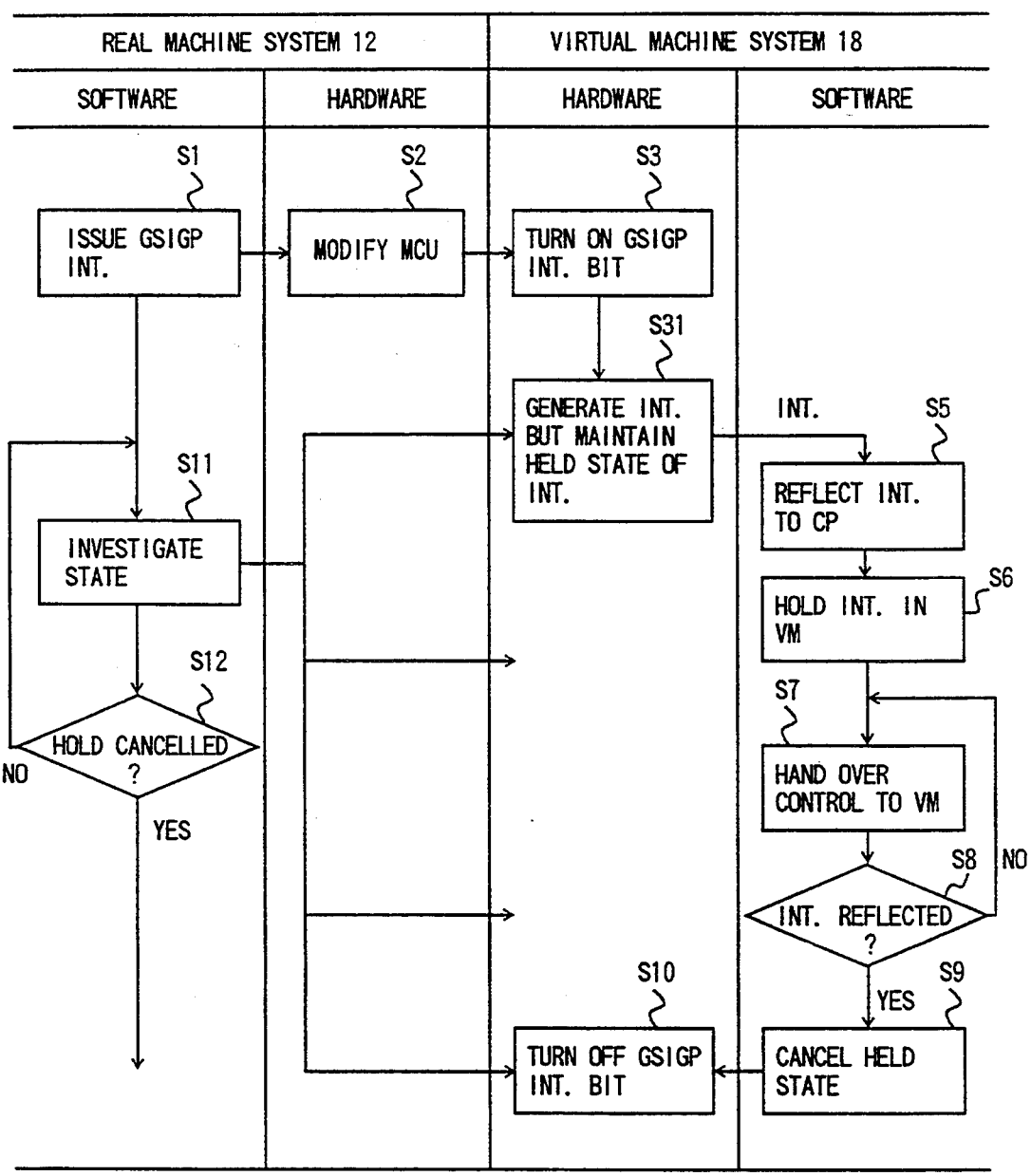
FIG. 11 is a flow chart for explaining a communication process between the real machine and the virtual machine in the embodiment.

FIG. 11 is a flow chart for explaining the communication process between the real machine system and the virtual machine system in this embodiment. In FIG. 11, those steps which are essentially the same as those corresponding steps in FIG. 4 are designated by the same reference numerals.

In FIG. 11, the software of the real machine 10 issues a GSIGP interrupt in a step S1. The hardware of the real machine system (computer system 30-1) modifies the MCU of the other hardware in a step S2.

Then, the hardware of the virtual machine system (computer system 30-2) turns ON a GSIGP interrupt bit of the MCU in a step S3. In addition, the hardware of the virtual machine system generates the GSIGP interrupt with respect to the control program (CP) 16, but maintains the held state of the GSIGP interrupt, in a step S31.

On the other hand, the software of the virtual machine system reflects the GSIGP interrupt from the hardware to the control program (CP) 16 in a step S5, and holds the GSIGP interrupt in the guest VM 14-1 in a step S6. Further, the control is handed over to the guest VM 14-1 in a step S7, and the reflection of the GSIGP interrupt is detected in a step S8. If the reflection of the GSIGP interrupt to the guest VM 14-1 is detected in the step S8, the held state of the GSIGP interrupt in the control program (CP) 16 is cancelled in a step S9.

Hence, the hardware of the virtual machine system turns OFF the GSIGP interrupt bit in a step S10 in response to the cancellation of the held state in the step S9.

On the other hand, the held and reflected states of the GSIGP interrupt can be monitored from the source of the GSIGP interrupt, that is, the software of the real machine 10. More particularly, the software of the real machine 10 investigates the state of the virtual machine system in a step S11, and the cancellation of the held state of the GSIGP interrupt is detected in a step S12.

However, as may be seen from FIG. 11, the held state is cancelled simultaneously as the generation of the GSIGP interrupt with respect to the control program (CP) 16. As a result, the real machine 10 can confirm that the GSIGP interrupt has been reflected to the guest VM 14-1 at the time when the GSIGP interrupt is actually reflected to the guest VM 14.

Next, a description will be given of an initial program load (IPL) function of the virtual machine system using the GSIGP function 22.

FIG. 12 is a flow chart for explaining this IPL function of the virtual machine system. In FIG. 12, those steps which are essentially the same as those corresponding steps in FIG. 5 are designated by the same reference numerals.

In FIG. 12, the software of the real machine 10 issues a GSIGP interrupt of an IPL request in a step S1 so as to realize the IPL function of the virtual machine system. The hardware of the real machine system modifies the MCU of the other hardware in a step S2.

Then, the hardware of the virtual machine system stores IPL information of the MCU, turns ON the GSIGP interrupt bit of the MCU, and holds the interrupt in a step S41.

A service processor (SVP) 66, which is independent of the hardware and software of the virtual machine system (30-2) in FIG. 12, is coupled to the SU 36 as indicated by a dotted line in FIG. 7. This service processor 66 carries out service processes such as supervision. The service processor 66 starts a time supervision in a step S42 when the GSIGP interrupt is held in the step S41.

At the same time, the software of the virtual machine system investigates the IPL information in a step S45, and a decision is made in a step S46 as to whether or not the GSIGP interrupt is held. If the decision result in the step S46 is YES, the control program (CP) 16 makes the IPL to the VM 14 in a step S47, and the held state of the GSIGP interrupt is cancelled in a step S48.

If the IPL of the intended VM 14 is not completed within a time out period and a decision result in a step S44 is NO, the control program (CP) 16 is stopped because it is judged in this case that an abnormality has occurred. On the other hand, if the decision result in the step S44 is YES, the GSIGP interrupt bit of the MCU is turned OFF in a step S10.

Accordingly, the real machine 10 which is the source of the interrupt of the IPL request can investigate the state of the virtual machine system in the step S11 and decide in the step S12 whether or not the held state of the interrupt has been cancelled, so as to determine whether or not the IPL to the intended VM 14 has been completed.

In the embodiment described above, it was described for the sake of convenience that the communication is made from the CPU 32-1 of the computer system 30-1 shown in FIG. 7 to the guest VM which is realized by the CPU 32-4 of the other computer system 30-2. However, a communication can be made exactly in the same manner between the CPU of an arbitrary one of the computer systems 30-1 through 30-n and a guest VM which is realized by the CPU of another one of the computer systems 30-1 through 30-n.

Further, the present invention is not limited to these embodiments, but various variations and modifications may be made without departing from the scope of the present invention.

What is claimed is:

1. A global communication interrupt control system comprising:
   a real machine system including one or a plurality of real machines;
   a virtual machine system including one or a plurality of virtual machines which are realized by an operating system and a control program which makes the virtual machines operable; and
   a shared memory which is shared by said real machine system and said virtual machine system, said shared memory including global communication means for establishing a communication between an arbitrary real machine of said real machine system and an arbitrary virtual machine of said virtual machine system, said real machine including means for issuing an interrupt of a communication request with respect to a specific virtual machine using said global communication means, said virtual machine system comprising:

hold means for holding the interrupt from an arbitrary one of said real machines and reflecting the interrupt to the control program, so that the control program carries out an operation dependent on the interrupt; and cancel means for cancelling the holding of the interrupt by said hold means only after the control program reflects the interrupt to the specific virtual machine, so that said hold means continues to hold the interrupt until the interrupt is actually reflected to the specific virtual machine.

2. The global communication interrupt control system as claimed in claim 1, wherein said real machine further includes means for monitoring a state of said virtual machine system by monitoring whether or not the interrupt is held in said hold means.

3. The global communication interrupt control system as claimed in claim 1, wherein said hold means and said cancel means are formed by hardware of said virtual machine system.

4. The global communication interrupt control system as claimed in claim 1, wherein said real machine system includes hold means for holding an interrupt of a request to a specific real machine thereof received from another real machine or a virtual machine of said virtual machine system until the interrupt is reflected to said specific real machine.

5. The global communication interrupt control system as claimed in claim 1, wherein:

said real machine includes means for issuing an interrupt of an initial program load request to a predetermined virtual machine of said virtual machine system, said virtual machine system includes means for making an initial program load to said predetermined virtual machine by said control program if the interrupt of the initial program load request is held by said hold means, and said cancel means cancels the holding of the interrupt of the initial program load request when the initial program load to said predetermined virtual machine is complete.

6. The global communication interrupt control system as claimed in claim 5, wherein said real machine further includes means for monitoring a state of said virtual machine system by monitoring whether or not the interrupt of the initial program load request is held in said hold means.

7. The global communication interrupt control system as claimed in claim 5, wherein said hold means and said cancel means are formed by hardware of said virtual machine system.

8. An interrupt control system comprising:

a real machine system including one or a plurality of real machines;

a virtual machine system including one or a plurality of virtual machines which are realized by an operating system, and a control program which makes the virtual machines operable; and a shared memory which is shared by said real machine system and said virtual machine system, said shared memory including a global communication means for establishing a communication between an arbitrary real machine of said real machine system and an arbitrary virtual machine of said virtual machine system, said real machine including means for issuing an interrupt of a request with respect to a specific virtual machine using said global communication means, and said virtual machine system comprising:

hold means for holding the interrupt from an arbitrary one of said real machines and reflecting the interrupt to the control program, so that the control program carries out an operation dependent on the interrupt; and cancel means for cancelling the holding of the interrupt by said hold means only after the control program reflects the interrupt to the specific virtual machine, so that said hold means continues to hold the interrupt until the interrupt is actually reflected to the specific virtual machine.

9. The interrupt control system as claimed in claim 8, wherein said hold means and said cancel means are formed by hardware of said virtual machine system.

10. A global communication interrupt control system comprising:

a real machine system;

a first real machine associated with the real machine system;

a virtual machine system;

a first virtual machine, associated with the virtual machine system, which is realized by an operating system and a control program which makes the virtual machine operable; and a shared memory which is shared by said real machine system and said virtual machine system, said shared memory including global communication means for establishing communications between said first real machine and said first virtual machine, said first real machine comprising means for issuing an interrupt of a communication request with respect to said first virtual machine, using said global communication means; and said virtual machine system comprising:

hold means for holding the interrupt from said first real machine and reflecting the interrupt to the control program of said first virtual machine, so that operation of the control program is dependent on the interrupt; and cancel means for cancelling the holding of the interrupt by said hold means, after the control program reflects the interrupt to said first virtual machine, so that said hold means continues to hold the interrupt until the interrupt is reflected to said first virtual machine.

11. The global communication interrupt control system as claimed in claim 10, wherein:

said real machine system comprises plural real machines comprising said first real machine and successive real machines, each said real machine including corresponding said means for issuing an interrupt of a communication request;

said virtual machine system comprises plural virtual machines comprising said first virtual machine and successive virtual machines, each said virtual machine being realized by a corresponding said operating system and a corresponding said control program;

said global communication means further comprises means for establishing communications between a selected real machine of said plural real machines and a selected virtual machine of said plural virtual machines;

said hold means holds interrupts from said plural real machines, each interrupt corresponding to a real machine of said plural real machines, and reflects each of the interrupts to a corresponding said control program of said plural virtual machines; and said cancel means cancels the holdings of the interrupts by said hold means, each of the interrupts being cancelled when the corresponding said control program reflects the corresponding interrupt.

12. The global communication interrupt control system as claimed in claim 11, wherein:

said selected real machine further comprises means for issuing an interrupt of an initial program load request to the selected virtual machine of said virtual machine system;

said virtual machine system further comprises means for making an initial program load to the selected virtual machine by the corresponding control program if said hold means is holding the interrupt of the initial program load request; and said cancel means cancels the holding of the interrupt of the initial program load request, said cancel means cancelling the holding of the interrupt when the initial program load to the selected virtual machine is complete.

13. The global communication interrupt control system as claimed in claim 12, wherein said real machine further comprises means for monitoring a state of said virtual machine system based on whether said hold means is holding the interrupt of the initial program load request.

14. The global communication interrupt control system as claimed in claim 11, wherein said real machine system further comprises hold means for holding an interrupt of a request to the selected real machine of said plural real machines received from one of another real machine of said plural real machines and the selected virtual machine of said plural virtual machines, until the interrupt is reflected to the selected real machine.

15. The global communication interrupt control system as claimed in claim 10, wherein said real machine further comprises means for monitoring a state of said virtual machine system by determining whether said hold means is holding the interrupt.

16. The global communication interrupt control system as claimed in claim 10, wherein:

said real machine further comprises means for issuing an interrupt of an initial program load request to said first virtual machine of said virtual machine system;

said virtual machine system further comprises means for making an initial program load to said first virtual machine by the control program if said hold means is holding the interrupt of the initial program load request; and said cancel means cancels the holding of the interrupt of the initial program load request when the initial program load to said first virtual machine is complete.

17. The global communication interrupt control system as claimed in claim 16, wherein said real machine further comprises means for monitoring a state of said virtual machine system based on whether said hold means is holding the interrupt of the initial program load request.

18. The global communication interrupt control system as claimed in claim 16, wherein said hold means and said cancel means are formed by hardware of said virtual machine system.

19. The global communication interrupt control system as claimed in claim 10, wherein said hold means and said cancel means are formed by hardware of said virtual machine system.

20. An interrupt control system comprising:

a real machine system;

a first real machine associated with the real machine system;

a virtual machine system;

a first virtual machine, associated with the virtual machine system, which is realized by an operating system and a control program which controls an operation of the first virtual machine;

a shared memory which is shared by said real machine system and said virtual machine system, said shared memory including a global communication means for establishing communications between the first real machine of said real machine system and the first virtual machine of said virtual machine system, the first real machine comprising means for issuing an interrupt of a request with respect to the first virtual machine, using said global communication means; and said virtual machine system comprising:

hold means for holding the interrupt from the first real machine and reflecting the interrupt to the control program of the first virtual machine, so that the control program carries out an operation dependent on the interrupt; and cancel means for cancelling the holding of the interrupt by said hold means, the interrupt being cancelled after the control program reflects the interrupt to the first virtual machine, so that said hold means continues to hold the interrupt until the interrupt is actually reflected to the first virtual machine.

21. An interrupt control system as claimed in claim 20, wherein:

said real machine system comprises plural real machines comprising said first real machine and successive real machines, each said real machine including corresponding said means for issuing an interrupt of a communication request;

said virtual machine system comprises plural virtual machines comprising said first virtual machine and successive virtual machines, each said virtual machine being realized by a corresponding said operating system and a corresponding said control program;

said global communication means further comprises means for establishing communications between a selected real machine of said plural real machines and a selected virtual machine of said plural virtual machines;

said hold means holds the corresponding interrupt from the selected real machine and reflects the corresponding interrupt to the corresponding said control program of the selected virtual machine, so that the corresponding said control program carries out an operation dependent on the corresponding interrupt; and cancel means for cancelling the holding of the corresponding interrupt by said hold means, the corresponding interrupt being cancelled after the corresponding control program reflects the corresponding interrupt to the selected virtual machine, so that said hold means continues to hold the corresponding interrupt until the corresponding interrupt is actually reflected to the selected virtual machine.

22. The interrupt control system as claimed in claim 18, wherein said hold means and said cancel means are formed by hardware of said virtual machine system.

23. A global communication interrupt control system for establishing a communication between a real machine and a virtual machine selected to be in communication with each other, the system comprising:
- a real machine system including one or a plurality of real machines;
- a virtual machine system including one or a plurality of virtual machines which are realized by an operating system and a control program which makes the virtual machines operable; and
- a shared memory which is shared by said real machine system and said virtual machine system, said shared memory including global communication means for establishing said communication between said real and virtual machines, respectively of said one or said plurality thereof, selected to be in communication with each other;
- said selected real machine including means for issuing an interrupt of a communication request with respect to said selected virtual machine using said global communication means;
- said selected virtual machine system comprising:
  - hold means for holding the interrupt from said selected real machine and reflecting the interrupt to the control program, so that the control program carries out an operation dependent on the interrupt, and
  - cancel means for cancelling the holding of the interrupt by said hold means only after the control program reflects the interrupt to the selected virtual machine, so that said hold means continues to hold the interrupt until the interrupt is actually reflected to the selected virtual machine.

24. A global communication interrupt control system comprising:
- a real machine system including one or a plurality of real machines;
- a virtual machine system including one or a plurality of virtual machines which are realized by an operating system and a control program which makes the virtual machines operable; and
- a shared memory which is shared by said real machine system and said virtual machine system, said shared memory including global communication means for establishing a communication between an arbitrary real machine of said real machine system and an arbitrary virtual machine of said virtual machine system,
- said real machine including means for issuing an interrupt of an initial program load request with respect to a specific virtual machine using said global communication means,
- said virtual machine system comprising:
  - hold means for holding the interrupt of the initial program load request from an arbitrary one of said real machines and reflecting said interrupt to the control program;
  - means for making an initial program load to said specific virtual machine by said control program if said interrupt is held by said hold means; and
  - cancel means for cancelling the holding of said interrupt by said hold means when the initial program load to said specific virtual machine is complete.

25. The global communication interrupt control system as claimed in claim 24, wherein said real machine further comprises:
means for monitoring a state of said virtual machine system based on whether said hold means is holding the interrupt of the initial program load request.

26. The global communication interrupt control system as claimed in claim 24, wherein said hold means and said cancel means are formed by hardware of said virtual machine system.

27. The global communication interrupt control system as claimed in claim 26, wherein:
said real machine system comprises plural real machines comprising said first real machine and successive real machines, each said real machine including corresponding said means for issuing an interrupt of a communication request;

said virtual machine system comprises plural virtual machines comprising said first virtual machine and successive virtual machines, each said virtual machine being realized by a corresponding said operating system and a corresponding said control program and each respective virtual machine having a respective hold means, a respective means for performing an operation, and a respective cancel means;

said global communication means further comprises means for establishing communications between a selected real machine of said plural real machines and a selected virtual machine of said plural virtual machines;

each said respective hold means holds interrupts from said plural real machines, each interrupt corresponding to a real machine of said plural real machines, and reflects each of the interrupts to a corresponding said control program of the respective virtual machine; and said cancel means cancels the holdings of the interrupts by said hold means, each interrupt of the communication request being cancelled when the corresponding said control program reflects the corresponding interrupt and each interrupt of the operation request being cancelled when the operation to the respective virtual machine is complete.

28. A global communication interrupt control system comprising:
- a real machine system;
- a first real machine associated with the real machine system;
- a virtual machine system;

a first virtual machine, associated with the virtual machine system, which is realized by an operating system and a control program which makes the virtual machine operable; and a shared memory which is shared by said real machine system and said virtual machine system, said shared memory including global communication means for establishing communications between said first real machine and said first virtual machine;

said first real machine comprising means for issuing interrupts with respect to said first virtual machine, using said global communication means, each said interrupt being one of a communication request and an operation request; and said virtual machine system comprising:

hold means for holding the interrupts from said first real machine and reflecting the interrupts to the control program of said first virtual machine, so that operation of the control program is dependent on the interrupts, said hold means being able to hold only one communication request at a time and one operation request at a time;

means for performing an operation indicated by the operation request for said first virtual machine by said control program if said operation request is held by said hold means; and cancel means for cancelling the holding of the communication request by said hold means, after the control program reflects the communication request to said first virtual machine, so that said hold means continues to hold the communication request until the communication request is reflected to said first virtual machine and for cancelling the holding of said operation request by said hold means when the operation for said first virtual machine is complete.

29. The global communication interrupt control system as claimed in claim 28, wherein:

said real machine system comprises plural real machines comprising said first real machine and successive real machines, each said real machine including corresponding said means for issuing an interrupt of a communication request and an interrupt of an operation request;

said virtual machine system comprises plural virtual machines comprising said first virtual machine and successive virtual machines, each said virtual machine being realized by a corresponding said operating system and a corresponding said control program;

said global communication means further comprises means for establishing communications between a selected real machine of said plural real machines and a selected virtual machine of said plural virtual machines;

said hold means holds interrupts from said plural real machines, each interrupt corresponding to a real machine of said plural real machines, and reflects each of the interrupts to a corresponding said control program of said plural virtual machines, said hold means being able to hold one interrupt of a communication request and one interrupt of an operation request at a time;

said means for performing an operation performing an operation to the selected virtual machine if the operation request is held by said hold means; and said cancel means cancels the holdings of the interrupts by said hold means, each of the interrupts of the communication request being cancelled when the corresponding said control program reflects the corresponding interrupt and each of the interrupts of the operation request being cancelled when the operation to the selected virtual machine is complete.

* * * * *

UNITED STATES PATENT AND TRADEMARK OFFICE
CERTIFICATE OF CORRECTION

PATENT NO. : 5,452,462
DATED : Sep. 19, 1995
INVENTOR(S) : MATSUURA et al

It is certified that error appears in the above-indentified patent and that said Letters Patent is hereby corrected as shown below:

Col. 3, line 63, change "(GSIG P)" to --(GSIGP)--;
line 68, change "Peal" to --real--.

Col. 15, line 20 (Claim 22, line 2), change "18" to --20--.

Signed and Sealed this

Thirteenth Day of February, 1996

BRUCE LEHMAN

Attest:

Attesting Officer    Commissioner of Patents and Trademarks